(12) United States Patent
Ushijima et al.

(10) Patent No.: US 7,612,569 B2
(45) Date of Patent: Nov. 3, 2009

(54) OSCILLATING DEVICE, ELECTRIC POTENTIAL MEASURING DEVICE, LIGHT DEFLECTING DEVICE, AND IMAGE FORMING APPARATUS

(75) Inventors: Takashi Ushijima, Yokohama (JP); Yoshikatsu Ichimura, Tokyo (JP); Atsushi Kandori, Ebina (JP); Yoshitaka Zaitsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 11/670,277

(22) Filed: Feb. 1, 2007

(65) Prior Publication Data

US 2007/0182419 A1    Aug. 9, 2007

(30) Foreign Application Priority Data

Feb. 9, 2006    (JP) .............................. 2006-031806

(51) Int. Cl.
*G01R 27/26* (2006.01)
*G01R 29/12* (2006.01)
*G01H 11/00* (2006.01)
*G03G 15/00* (2006.01)

(52) U.S. Cl. ..................... 324/663; 324/458; 73/649; 399/48

(58) Field of Classification Search ................ 324/663, 324/458; 73/649
See application file for complete search history.

(56) References Cited

U.S. PATENT DOCUMENTS

| | | | |
|---|---|---|---|
| 3,852,667 A | 12/1974 | Williams et al. ............. 324/72 |
| 4,205,267 A | 5/1980 | Williams .................... 324/458 |
| 4,720,682 A | 1/1988 | Ikushima et al. ........... 324/458 |
| 4,763,078 A | 8/1988 | Williams .................... 324/458 |
| 4,835,461 A | 5/1989 | Snelling .................... 324/109 |
| 5,212,451 A | 5/1993 | Werner, Jr. ................. 324/458 |
| 5,317,152 A | 5/1994 | Takamatsu et al. ......... 250/306 |
| 5,357,108 A | 10/1994 | Suzuki et al. .............. 250/306 |
| 5,489,850 A | 2/1996 | Werner, Jr. et al. ......... 324/458 |
| 5,554,851 A | 9/1996 | Hirai et al. ............. 250/442.11 |
| 5,574,279 A | 11/1996 | Ikeda et al. ................. 250/306 |
| 5,585,730 A * | 12/1996 | Pazda et al. ................. 324/452 |
| 5,923,637 A | 7/1999 | Shimada et al. ............ 369/126 |
| 6,046,972 A | 4/2000 | Kuroda et al. .............. 369/126 |
| 6,075,639 A | 6/2000 | Kino et al. ................. 359/224 |
| 6,163,519 A | 12/2000 | Kuroda et al. .............. 369/126 |
| 6,177,800 B1 | 1/2001 | Kubby et al. ............... 324/458 |
| 6,223,597 B1 * | 5/2001 | Watarai ................... 73/504.16 |
| 6,337,477 B1 | 1/2002 | Shimada et al. ............ 250/216 |

(Continued)

FOREIGN PATENT DOCUMENTS

JP    6-123845    5/1994

(Continued)

*Primary Examiner*—Jeff Natalini
(74) *Attorney, Agent, or Firm*—Fitzpatrick, Cella, Harper & Scinto

(57) ABSTRACT

Oscillating device including a movable member that is vibratable, a fixed section that is provided opposite to the movable member, a driving unit configured to drive the movable member, and at least two electrodes configured to generate a first signal corresponding to a drive state of the movable member. At least one electrode is provided on the movable member, and at least one electrode is provided on the fixed section. The driving unit can control the driving of the movable member on the basis of the first signal.

11 Claims, 11 Drawing Sheets

U.S. PATENT DOCUMENTS

| | | | |
|---|---|---|---|
| 6,452,399 B1 | 9/2002 | Werner, Jr. | 324/458 |
| 6,504,375 B1 * | 1/2003 | Werner et al. | 324/458 |
| 6,600,323 B2 | 7/2003 | Kieres et al. | 324/458 |
| 6,831,765 B2 | 12/2004 | Yasuda et al. | 359/224 |
| 6,965,239 B2 | 11/2005 | Yasuda et al. | 324/458 |
| 7,002,719 B2 | 2/2006 | Tran | 359/323 |
| 7,005,776 B1 * | 2/2006 | Iino et al. | 310/316.01 |
| 7,049,804 B2 * | 5/2006 | Ichimura et al. | 324/457 |
| 7,079,298 B2 | 7/2006 | Kandori | |
| 7,126,452 B2 | 10/2006 | Teshima et al. | 336/200 |
| 7,149,017 B2 | 12/2006 | Kandori | |
| 7,149,442 B2 * | 12/2006 | Ushijima et al. | 399/48 |
| 7,173,747 B2 | 2/2007 | Yasuda et al. | 359/224 |
| 7,504,832 B2 * | 3/2009 | Kandori et al. | 324/457 |
| 2006/0001432 A1 | 1/2006 | Yasuda et al. | 324/458 |
| 2006/0171728 A1 | 8/2006 | Ichimura et al. | 399/48 |

FOREIGN PATENT DOCUMENTS

| | | |
|---|---|---|
| JP | 7-306237 | 11/1995 |
| JP | 8-304474 | 11/1996 |
| JP | 9-96552 | 4/1997 |
| JP | 9-101474 | 4/1997 |
| JP | 10-339754 | 12/1998 |
| JP | 2000-55670 | 2/2000 |
| JP | 2001-305471 | 10/2001 |
| WO | 2004/088333 A1 | 10/2004 |
| WO | 2004/088335 A1 | 10/2004 |

\* cited by examiner

OSCILLATING DEVICE, ELECTRIC POTENTIAL MEASURING DEVICE, LIGHT DEFLECTING DEVICE, AND IMAGE FORMING APPARATUS

BACKGROUND OF THE INVENTION

1. Field of the Invention

The present invention relates to an oscillating device that oscillates a movable member with respect to a fixed section and that may be employed as an electric potential measuring device configured to detect an electric potential of an object on the basis of a fluctuation in the amount of electric charge generated at a detection electrode or a light deflecting device configured to deflect light. More specifically, the present invention relates to an optical apparatus, such as an image forming apparatus, including the electric potential measuring device.

2. Description of the Related Art

As methods of obtaining driving information of movable members (oscillators) of sensor apparatuses, there are known methods employing distortion detection elements. Japanese Patent Laid-Open No. 9-96552 describes a configuration employing a piezoresistance element that is formed on a silicon substrate by diffusion of n-type or p-type impurities.

Japanese Patent Laid-Open No. 8-304474 describes another method of obtaining driving information of a movable member employing a capacitor. The capacitor is constructed by providing electrodes between a movable member (substrate) and a supporting member (top panel) that supports the movable member in a manner such that the electrodes oppose each other.

Japanese Patent Laid-Open No. 7-306237 describes an electric potential measuring device capable of changing the area of a detection electrode that is visible from an object to be detected and a method of obtaining driving information of a movable member (oscillating element) using a piezoelectric pickup. The detection electrode of the electric potential measuring device is provided on the oscillating element and is disposed opposite to the object. In this state, the detection electrode moves left and right and moves into and out of sight through an opening. According to this configuration, at the detection electrode, whose area visible from the object changes, an electric charge is generated and then fluctuates so as to generate an alternating current signal.

Japanese Patent Laid-Open No. 2001-305471 describes a light deflecting device formed by focusing on the fact that the fluctuation angle of an electromagnetic actuator (movable section) is not constant, depending on the environment, when an electric current having a predetermined resonance frequency is continuously supplied to a coil. The lack of consistency is because the resonance period of the movable part changes in accordance with environmental changes. This light deflecting device that oscillates a movable member having a total reflection mirror by an electromagnetic force uses the coil to drive the movable section and to detect the drive state of the movable section. For the detection, an induced electric voltage or an induced electric current generated at the coil is used.

According to Japanese Patent Laid-Open Nos. 9-96552 and 7-306237, a piezoresistance element or a piezoelectric pickup is provided to obtain drive information of a movable member of a sensor apparatus. According to Japanese Patent Laid-Open No. 9-96552, to prepare the piezoresistance element, the material used for making the substrate is limited or a process of forming a diffusion layer is required. According to Japanese Patent Laid-Open No. 7-306237, a step of preparing the piezoelectric pickup and a step of attaching the piezoelectric pickup are required. Depending on the configuration, the characteristics of a distortion detection element and the piezoelectric pickup may changed due to influence of the temperature of the use environment. Thus, even when constant driving is carried out, the drive information would undergo changes.

According to Japanese Patent Laid-Open No. 8-304474, electrodes constituting a capacitor only are capable of detecting the tilt angle between the substrate and the top panel.

According to Japanese Patent Laid-Open No. 2001-305471, the preparation of a coil, which is a detection unit, is complicated, and the subsequent steps of processing the induced electric voltage or induced electric current are also complicated.

SUMMARY OF THE INVENTION

By taking into consideration the above-identified problems, an oscillating device according to an embodiment of the present invention includes a movable member that is vibratable (including otherwise movable, shakable, or oscillatory at a high rate of speed), a fixed section that is provided opposite to the movable member, a driving unit configured to drive the movable member, and at least two electrodes configured to generate a first signal corresponding to a drive state of the movable member. At least one electrode is provided on the movable member, and at least one electrode is provided on the fixed section. The driving unit can control the driving of the movable member on the basis of the first signal.

By taking into consideration the above-identified problems, an image forming apparatus includes the above-described oscillating device that is provided as an electric potential measuring device and an image forming unit, wherein the image forming unit controls image formation by using a sensor output signal obtained by the electric potential measuring device.

Further features of the present invention will become apparent from the following description of exemplary embodiments (with reference to the attached drawings).

DESCRIPTION OF THE EMBODIMENTS

Embodiments of the present invention will be described below. An oscillating device according to an embodiment of the present invention includes a movable member that oscillates, a fixed section, such as a support member, that supports the movable member, a driving unit that drives the movable member, and electrodes that are provided on the movable member and the fixed section and generate a signal corresponding to the drive state of the movable member (i.e., drive-based signals). When required, the driving unit drives the movable member using the signal information.

According to an embodiment of the present invention, the electrodes that generate a signal corresponding to the drive state of the movable member constitute a capacitor by being disposed opposite to each other with a gap therebetween. As the drive state of the movable member changes, the capacitance of the capacitor changes, and this change can be detected as a signal. According to an embodiment of the present invention, the electrodes (also referred to as capacitor electrodes) may be comb-shaped electrodes that engage with each other with gaps therebetween. The number of electrodes is not limited to one pair, and a plurality of electrode pairs may be provided. The phases of the drive-based signals from the plurality of electrode pairs may be the same or may be different by 180°. The movable member may be supported so that it can flexurally vibrate or be torsion driven.

The oscillating device may be employed as an electric potential measuring device or a light deflecting device. For the electric potential measuring device, a detection electrode is provided on the movable member or the fixed section, and the capacitance between an object to be measured and the detection electrode is changed as the movable member is driven. Then, the change in capacitance causes a fluctuation in the amount of electric charge in accordance with the electric potential of the object. A sensor output signal is obtained on the basis of the fluctuation in the amount of electric charge, and the electric potential of the object is measured. For the light deflecting device, a light deflecting element, such as a reflection mirror or a diffraction grating, is provided on the movable member.

EMBODIMENTS

Next, embodiments of the present invention will be described in detail with reference to the drawings.

First Embodiment

Figure 1A:
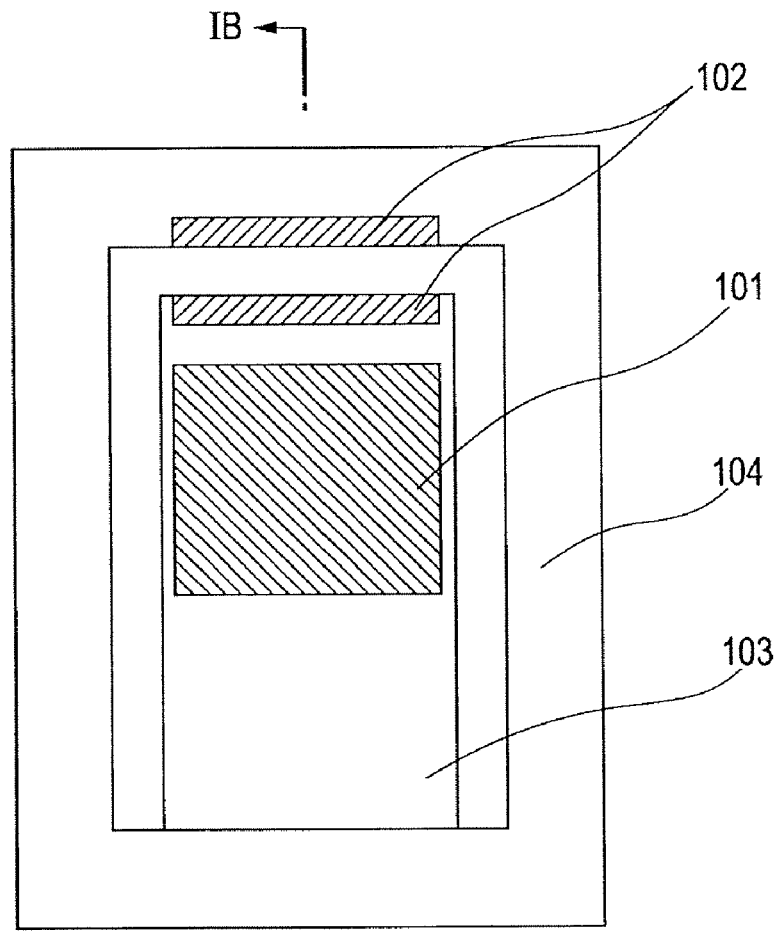
FIGS. 1A and 1B illustrate the structure of a sensor head associated with an electric potential measuring device according to an embodiment of the present invention.
Figure 1B:
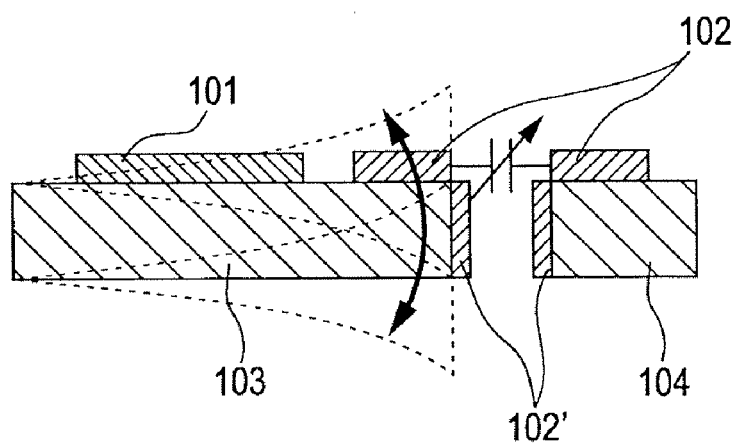

FIGS. 1A and 1B illustrate the structure of a sensor head associated with an electric potential measuring device according to a first embodiment of the present invention. FIG. 1A is a top view, and FIG. 1B is a cross-sectional view taken along line IB-IB in FIG. 1A. FIGS. 1A and 1B illustrate a detection electrode 101 that generates a fluctuation in the amount of electric charge in accordance with the electric potential of an object to be detected (not shown), a pair of capacitor electrodes 102, a movable member 103, and a support member 104 that supports the movable member 103 so that the movable member 103 can vibrate. The movable member 103 is driven by a driving-force generating unit (driving unit) described below. One capacitor electrode 102 is disposed opposite to the movable member 103 and the other capacitor electrode 102 is disposed opposite to the first cap 104 so that a drive-based signal corresponding to the drive state of the movable member 103 is generated. The drive state of the movable member 103 is detected on the basis of the drive-based signal information. Then, the driving-force generating unit controls the drive state of the movable member 103 using the detected result.

The detection electrode 101 and the pair of capacitor electrodes 102 are constituted of conductive bodies. These electrodes can be formed by attaching metal plates or the like. The electrodes can also be easily formed by carrying out film formation and patterning by employing a film formation method employed in a semiconductor process.

The movable member 103 and the support member 104 may be formed of the same material or, instead, may be formed of different materials. It is also possible to use materials, such as silicon or glass, that are used in a semiconductor process. In such a case, either conductive material or insulating material may be used. When a conductive material is used, insulating layers are provided between the detection electrode 101 and the capacitor electrodes 102 and between the movable member 103 and the support member 104.

Figure 2:
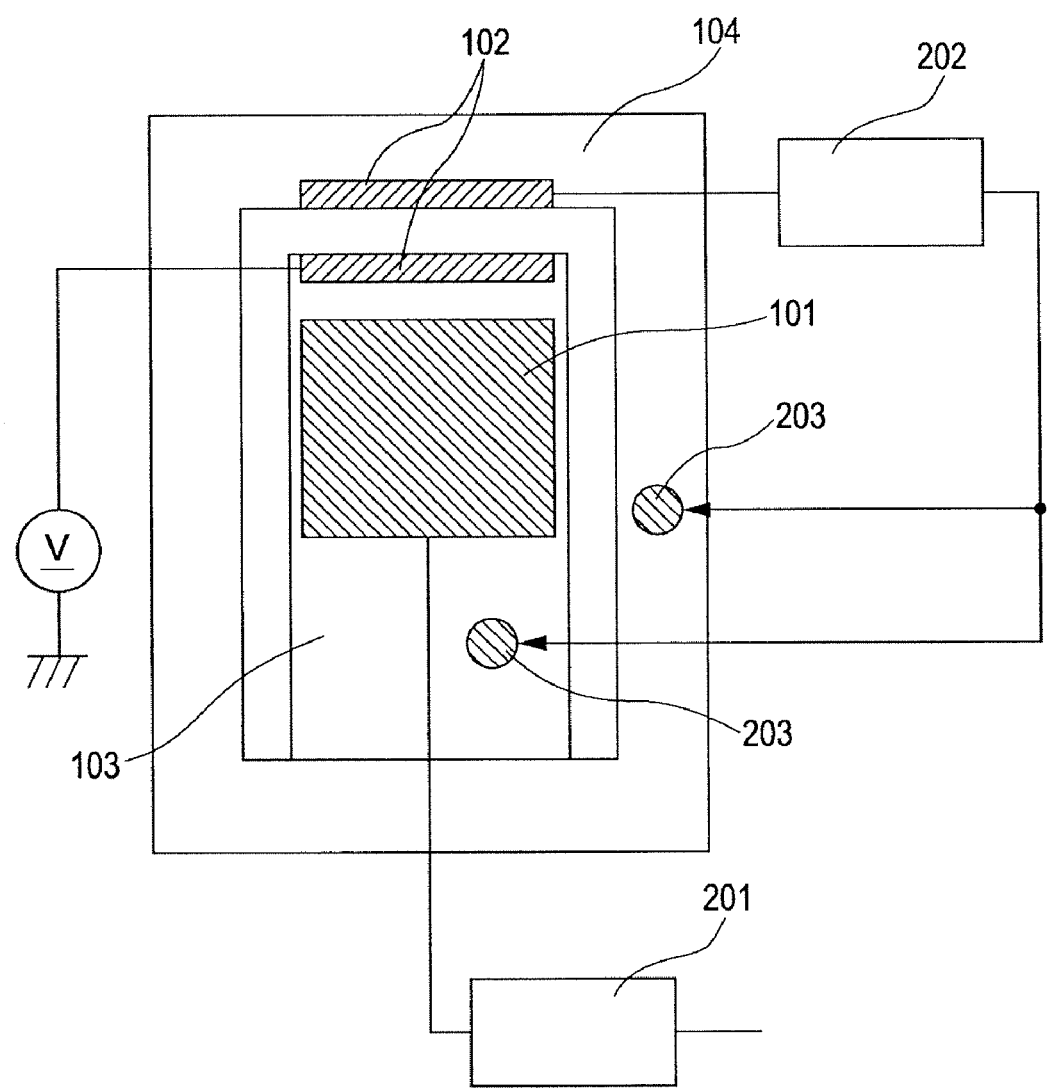
FIG. 2 is a top view of a structure obtained by adding a signal processing unit to the structure illustrated in FIGS. 1A and 1B.

FIG. 2 is a top view of a structure obtained by adding a signal processing unit to the structure illustrated in FIGS. 1A and 1B. The detection electrode 101 is connected to a sensor output signal processing unit 201, where the fluctuating electric charge signal from the detection electrode 101 is processed. Then, for example, signal processing is further carried out at a processing circuit provided downstream of the sensor output signal processing unit 201. The sensor output signal is processed at, for example, a feedback processing circuit unit that is used for canceling out the dependency on the measured distance from the electric potential measuring device to the object.

The general principle of measuring the electric potential of the object on the basis of a change in the amount of electric charge caused by a change in the amount of electric charge induced at the detection electrode 101 is described below.

When the amount of electric flux lines from the object to the detection electrode 101 changes for some reason (in the description below, this is described as a change in the area s of the detection electrode 101 that is visible from the object), the (coupling) capacitance C induced between the object and the detection electrode 101 changes. In general, the capacitance C can be represented as Expression 1:

$$C = (\epsilon \cdot s)/g \tag{1}$$

where $\epsilon$ represents the dielectric constant between the object and the detection electrode 101, g represents the distance between the object and the detection electrode 101, and s represents the area of the detection electrode 101 that is visible from the object.

The capacitance C can also be represented as Expression 2:

$$Q = C \times Vd \qquad (2)$$

where Q represents the amount of electric charge and Vd represents the electric potential of the object.

By substituting Expression 1 into Expression 2, Expression 3 is obtained:

$$Q = (\epsilon \cdot s)/g \times Vd \qquad (3)$$

Here, when the area s of the detection electrode 101 that is visible from the object changes over time t, Expression 3 can be represented as Expression 4. This change is generated by, for example, moving a blocking plate that is made of a conductive material into and out of the gap between the object and the detection electrode 101 (which is a case described below in a fifth embodiment) and changing the distance between the object and the detection electrode 101.

$$Q(t) = (\epsilon \cdot s(t))/g \times Vd \qquad (4)$$

Expression 5 is obtained by differentiating Expression 4 with respect to time t. Here, the change of the area ds(t)/dt over time is a known value.

$$dQ(t)/dt = I(t) = (\epsilon/g \cdot ds(t)/dt) \times Vd \qquad (5)$$

According to Expression 5, an electric current signal I(t) from the detection electrode 101 is obtained, and from this value, Vd can be determined. By carrying out, if required, current-to-voltage conversion of I(t) so as to improve the signal processing accuracy, a current output signal V(t) can be obtained, and the electric potential Vd of the object can be determined from the current output signal V(t). According to a method employing the above-described feedback processing circuit unit, a voltage is applied to an appropriate member (such as a chassis of a sensor probe), and the current output signal V(t) is adjusted to zero. The applied voltage at this time is defined as the electric potential Vd of the object.

Next, the capacitor electrodes 102 will be described. The capacitor electrodes 102 generate an electric potential difference therebetween. In FIG. 2, a constant electric potential is applied to the capacitor electrode 102 on the movable member 103. However, a constant electric potential may be applied to the capacitor electrode 102 on the fixed section (in this embodiment, the support member 104). In such a case, when the sensor head is driven, by applying a constant electric potential to the capacitor electrode 102 whose positional relationship with the detection electrode 101 does not change, an offset electric potential may be generated at the detection electrode 101. When a constant electric potential is applied to the capacitor electrode 102 on the fixed section, in some cases, a variable capacitor might be formed between the capacitor electrode 102 and the detection electrode 101, causing a noise signal to be generated. In either case, it is possible to determine and remove the noise signal by using a trimmer to adjust the noise signal. It is also possible to remove the noise component by differential amplification, described below.

The capacitor electrode 102 to which a constant electric potential is not applied is connected to a sensor-driving-signal processing unit 202, where the drive-based signal from the capacitor electrode 102 is processed so as to obtain information of the drive state (driving frequency, amplification, and drive amount) of the movable member 103. A driving signal having an optimal drive frequency and an electric power for driving is generated on the basis of the information and is supplied to a driving-force generating unit 203. When resonant drive is carried out for the movable member 103, the optimal signal has a predetermined amplification and a predetermined resonant frequency. According to the characteristic of resonant drive, when the frequency slightly deviates from the resonant frequency, the drive amplitude and drive amount significantly change. Therefore, the drive frequency and drive amount may be monitored or the drive amount alone may be monitored so as to obtain information on the drive state to control the drive frequency and the drive amount. However, the drive amount alone may be monitored to obtain information on the drive state so as to control the drive unit on the basis of the obtained information. In this way, the drive state of the movable member 103 is detected, when required, on the basis of at least one of the period and the signal level of the drive-based signal from the capacitor electrode 102. By feeding back the detected result to the driving unit, the period or the signal level of the drive-based signal can be controlled.

A physical or electrical force is applied to the movable member 103 to drive the movable member 103 by the driving-force generating unit 203. Various forces, such as electrostatic attraction, electromagnetic power, torsional force of a piezoelectric element, shape change of a shape-memory alloy, and vibration, may be used. As the driving-force generating unit 203, for example, a magnet may be disposed on the movable member 103 and a coil may be disposed on the support member 104. When an electric current is applied to the coil, a corresponding magnetic field is generated. The magnetic field causes an attractive force and a repulsive force to be generated at the magnet, and the movable member 103 is driven. In this case, the positional relationship of the magnet and the coil may be reversed, or, instead, two coils may be provided.

When electrostatic attraction is used, electrodes are formed on the movable member 103 and the support member 104 so that the electrodes oppose each other and generate a potential difference. The electrostatic attraction generated at that time drives the movable member 103. When driving is carried out by a piezoelectric element, a piezoelectric element is attached to at least one of the movable member 103 and the support member 104.

In the sensor head having the structure illustrated in FIGS. 1A and 1B, the movable member 103 vibrates in the vertical direction as it is supported at the support member 104 in a manner such as a cantilever, as indicated by the arrow in FIG. 1B. At this time, a fluctuation in the electric charge is caused by the vibration occurs at the capacitor electrode 102, and a drive-based signal is obtained. This signal is processed as described above.

According to this embodiment, as the movable member 103 moves up and down through one cycle of vertical vibration, one cycle of the sensor output signal is generated. At this time, two cycles of the drive-based signal are generate since the capacitor electrodes 102 goes through, twice, states in which the distance between the capacitor electrodes 102 is maximized and minimized or states in which the capacitor electrodes 102 oppose each other with maximum area and minimum area. Thus, the relationship between the frequency of the sensor output signal and the frequency of the drive-based signal is 1:2. If the sensor output signal and the drive-based signal influence each other as noise components since their cycles differ, the following measure may be taken. For example, the sensor output signal may be transmitted through a band-pass filter so as to obtain a sensor output signal having a great signal-to-noise (S/N) ratio. This is also the same for the drive-based signal.

As for the shape and the positions of the capacitor electrodes 102, as shown in FIG. 1B, plate-shaped capacitor electrodes 102 are disposed on the end sections of the upper surfaces of the movable member 103 and support member 104 so that the side surfaces of the capacitor electrodes 102 oppose each other. This structure is advantageous in that the capacitor electrodes 102 and the detection electrode 101 can be easily produced as a unit by employing a technology, such as microelectromechanical system (MEMS), because the capacitor electrodes 102 and the detection electrode 101 are provided on the same plane. Instead, however, for example, as shown in the drawing, plate-like capacitor electrodes 102' may be disposed at the end sections of the movable member 103 and support member 104 so that the flat surfaces of the plate-like capacitor electrodes 102' oppose each other. According to this structure, the level of the drive-based signal can be increased because the opposing areas of the capacitor electrodes 102' are increased.

Figure 3:
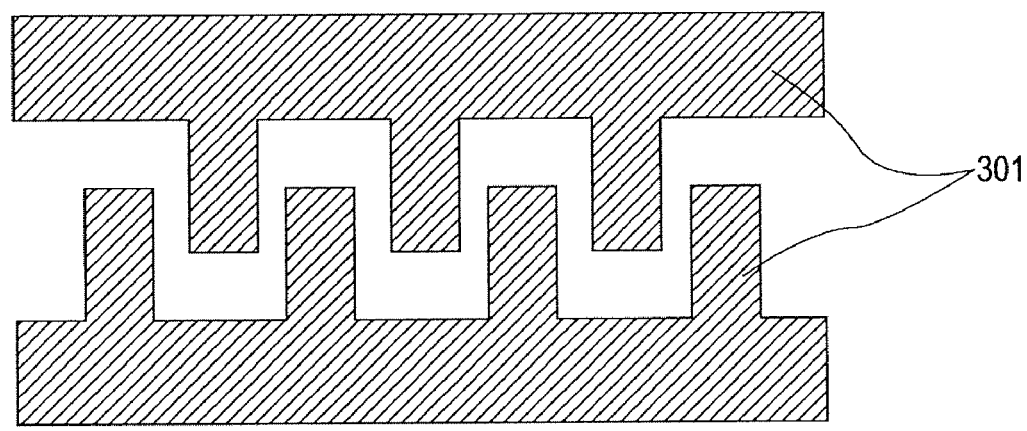
FIG. 3 illustrates the structure of a modification of capacitor electrodes.

FIG. 3 illustrates the structure of capacitor electrodes 301 according to a modification of the above-described embodiment. As shown in FIG. 3, by forming comb-shaped capacitor electrodes 301, the areas where the capacitor electrodes 301 are provided is increased, and thus, the opposing areas increase. In this way, the level of the drive-based signal can be increased. Therefore, the drive control of the movable member 103 can be carried out in a highly accurate manner. Moreover, an inexpensive operational amplifier may be used for amplifying the drive-based signal. Such comb-shaped capacitor electrodes can also be employed in the embodiments described below.

As described above, according to this embodiment, a capacitor is used as a drive detection unit. The capacitor can be produced by proving electrodes on a movable member and a support member (fixed section). Therefore, the material used for the members is not limited when producing a piezoresistance element. Furthermore, processes such as patterning and diffusion do not have to be carried out. The process for attaching the piezoelectric element is not required. Moreover, since the capacitor electrodes, which are drive detection units, can be produced together with the detection electrode in the detection electrode forming process, the cost of producing an electric potential measuring device can be reduced.

Second Embodiment

Figure 4:
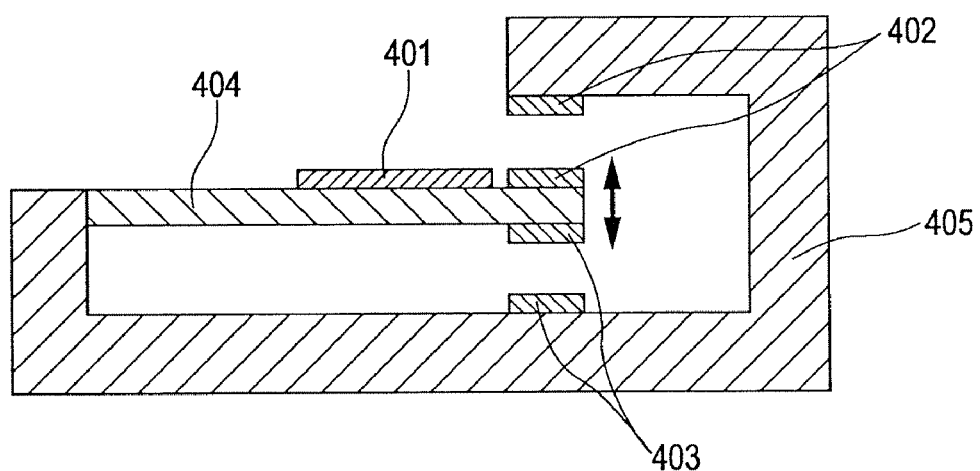
FIG. 4 is a cross-sectional view of the structure of a sensor head associated with an electric potential measuring device according to a second embodiment of the present invention that includes two pairs of capacitor electrodes.

FIG. 4 is a cross-sectional view of the structure of a sensor head associated with an electric potential measuring device according to a second embodiment of the present invention. According to this embodiment, two pairs of capacitor electrodes 402 and 403 are interposed between a movable member 404 and a support member 405. For the two pairs of capacitor electrodes 402 and 403, when the capacitor electrodes in one pair moves close to each other, the capacitor electrodes in the other pair move away from each other. Accordingly, drive-based signals having phases that differ by substantially 180° can be obtained. When differential amplification is carried out on these signals, signals having a great S/N ratio can be obtained. According to the second embodiment, the frequency of a sensor output signal from the detection electrode 401 and the frequency of each drive-based signal from the capacitor electrodes 402 or 403 has a 1:1 relationship.

The second embodiment differs from the first embodiment in the structure of the capacitor electrodes 402 and 403, the structure of the section of the support member 405 on which the capacitor electrodes 402 and 403 are provided, and the relationship between the frequency of the sensor output signal and the frequency of the drive-based signal. Other structures of the second embodiment are the same as those of the first embodiment.

Third Embodiment

Figure 5A:
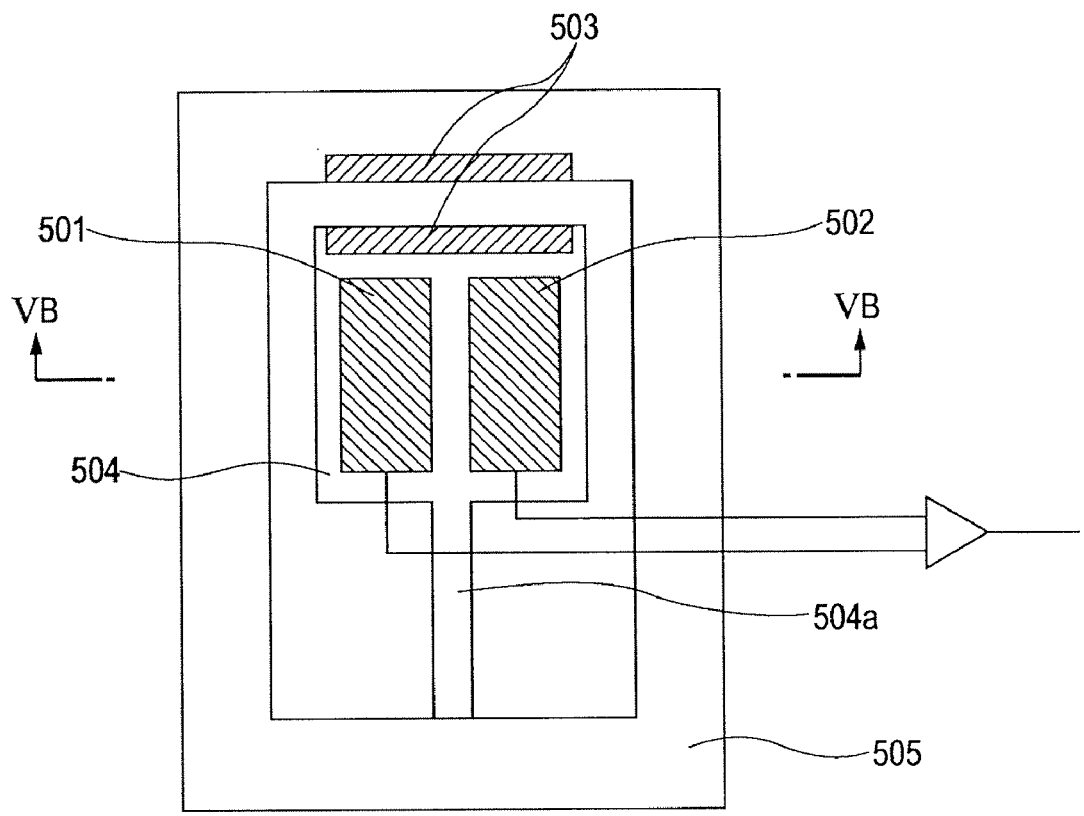
FIGS. 5A and 5B illustrate the structure of a sensor head associated with an electric potential measuring device according to a third embodiment of the present invention that includes a movable member to be torsion-driven.
Figure 5B:
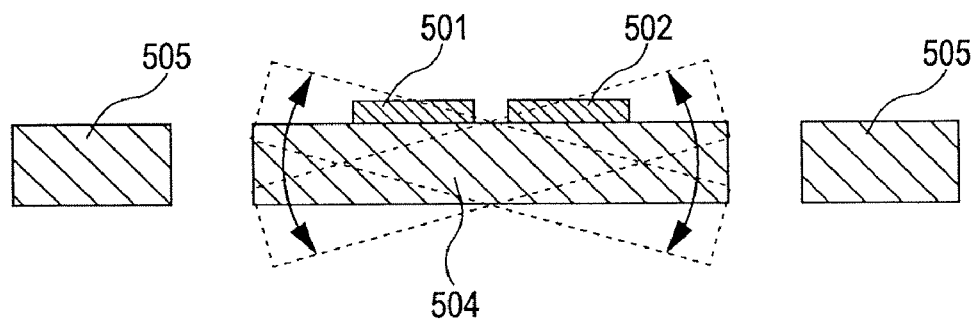

FIGS. 5A and 5B illustrate the structure of a sensor head associated with an electric potential measuring device according to a third embodiment of the present invention. FIG. 5A is a top view, and FIG. 5B is a cross-sectional view taken along line VB-VB of FIG. 5A. In FIGS. 5A and 5B, a movable member 504 is torsion-driven around a torsion axis (torsion bar) 504a having one of the ends supported by a support member 505, as illustrated in FIG. 5B. Detection electrodes 501 and 502 are provided substantially symmetrical with respect to the torsion axis 504a on the movable member 504. Therefore, when one of the detection electrodes moves close to the object to be detected, the other detection electrode moves away from the object. By carrying out such torsion driving, the phases of the sensor output signals obtained from the detection electrodes 501 and 502 differ by substantially 180°. Thus, differential amplification can be carried out on these signals, and sensor output signals having a great S/N ratio can be obtained.

As for the shape and the positions of the capacitor electrodes 102, as shown in FIG. 5B, the plate-like capacitor electrodes 503 are disposed on the upper surfaces of the end sections of the movable member 504 and support member 505 so that the side surfaces of the capacitor electrodes 503 oppose each other. Therefore, in this embodiment, for one cycle of a torsion vibration movement of the movable member 504, one cycle of a sensor output signal is generated. During this period, two cycles of a drive-based signal are generated because the capacitor electrodes 503 go through, twice, states in which the capacitor electrodes 503 oppose each other with maximum area and minimum area. In this way, the frequency of the sensor output signal and the frequency of the drive-based signal have a relationship of 1:2. Therefore, since the signal cycles differ according to this embodiment, for example, by transmitting the sensor output signals through a band-pass filter, sensor output signals with a great S/N ratio can be obtained.

The third embodiment differs from the first embodiment in the vibration mode of the movable member 504, the positioning of the detection electrodes 501 and 502, and the processing method of the sensor output signal. Other structures and operations according to the third embodiment are the same as those according to the first embodiment.

Fourth Embodiment

Figure 6A:
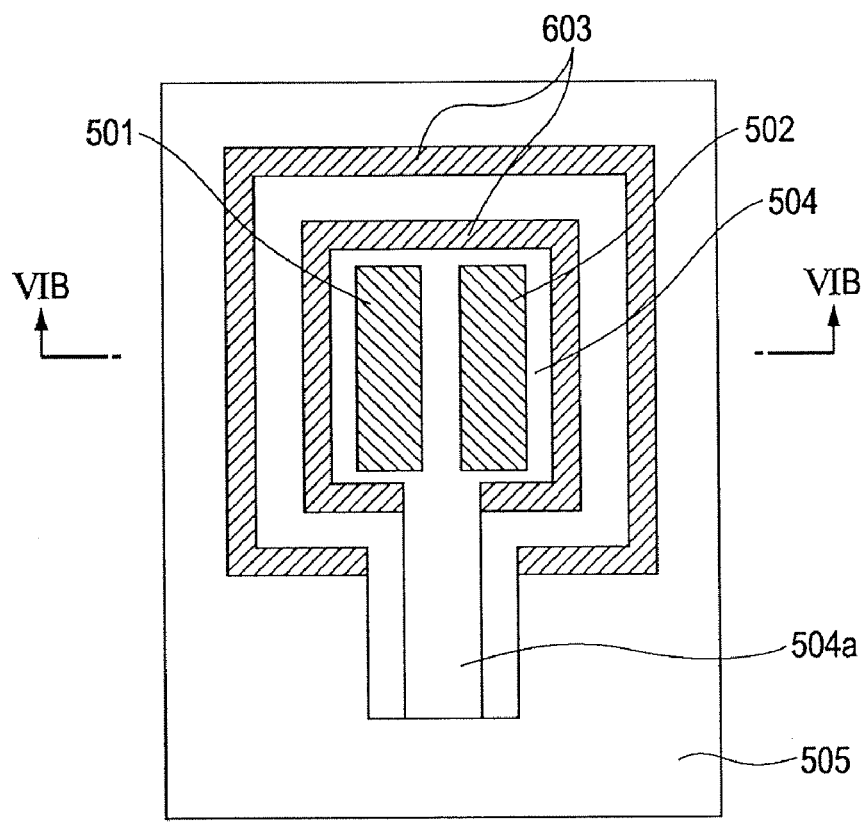
FIGS. 6A and 6B illustrate the structure of a sensor head associated with an electric potential measuring device according to a fourth embodiment of the present invention.
Figure 6B:
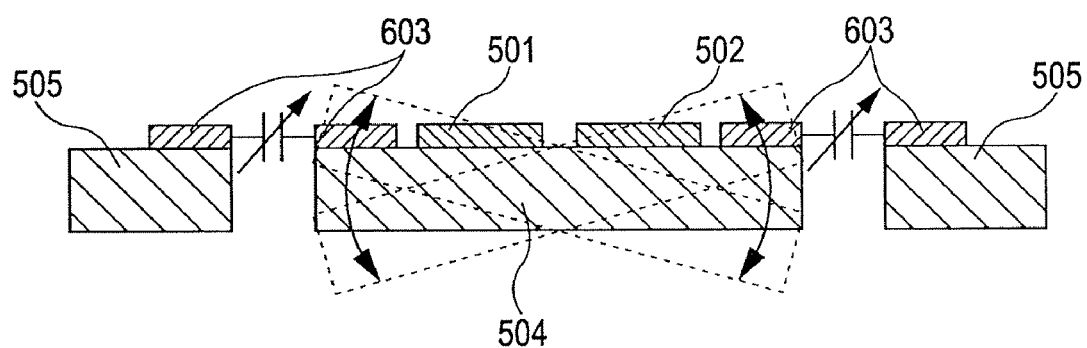

FIGS. 6A and 6B illustrate the structure of a sensor head associated with an electric potential measuring device according to a fourth embodiment of the present invention. FIG. 6A is a top view, and FIG. 6B is a cross-sectional view taken along VIC-VIC in FIG. 6A. In this embodiment, as shown in FIGS. 6A and 6B, capacitor electrodes 603 are disposed in a manner such as to surround a movable member 504. Since the area where the capacitor electrodes 603 is disposed is increased, the level of the drive-based signal can be increased. Other structures are the same as those according to the third embodiment.

According to the structure illustrated in FIGS. 6A and 6B, the capacitor electrodes 603 may be provided only in sections that are parallel to a torsion axis (torsion bar) 504a so that two pairs of capacitor electrodes 603 are provided on the left and right sides of the torsion axis 504a in a manner such as to sandwich the torsion axis 504*a*. In such a case, since two drive-based signals whose phases are the same and whose frequency is substantially two times the frequency of the sensor output signal are output, these signals can be added to detect the drive state of the movable member 504. In this case, if the torsion bar is not subject to any deformation (for example, bending) other than torsion, the magnitudes of the two drive-based signals are the same. In contrast, if the torsion bar is subject to any deformation (for example, bending) other than torsion, the magnitudes of the two drive-based signals differ. This difference is generated because the gaps (capacitance) formed on the left and right sides differ. As a result, when the operation of the oscillating body is abnormal, this abnormal operation can be detected by the generated signal. Furthermore, by carrying out feedback control on the basis of this signal, the operation can be corrected better.

Fifth Embodiment

Figure 7A:
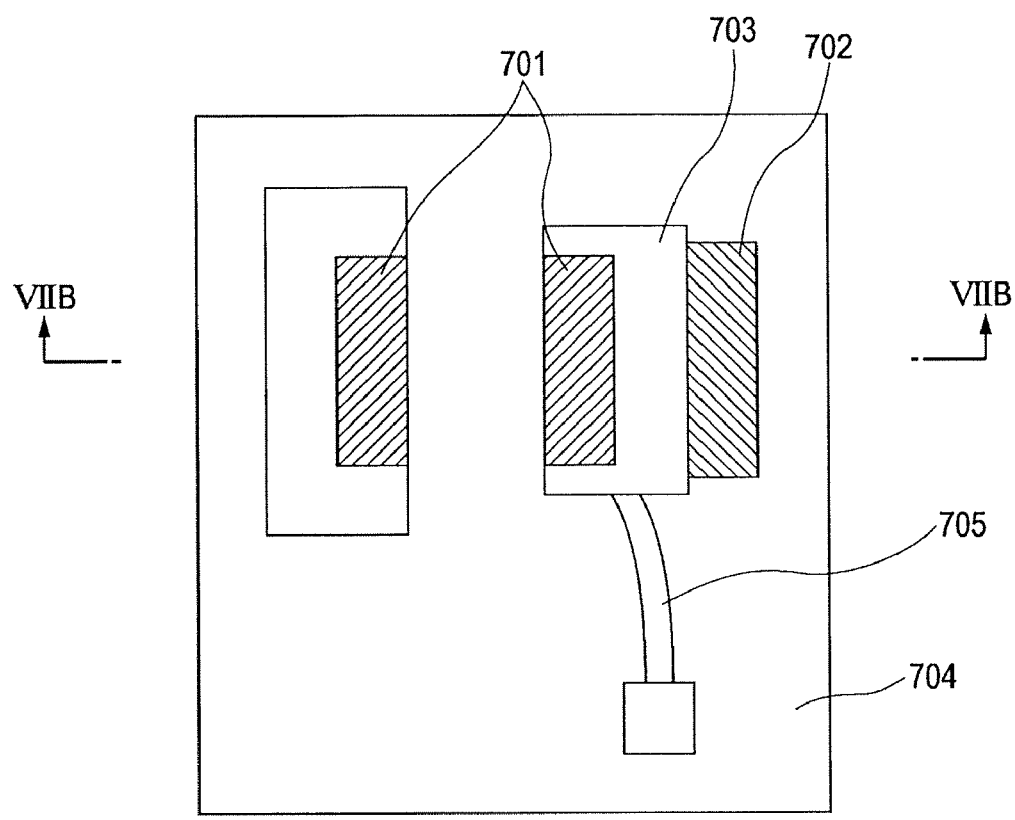
FIGS. 7A and 7B illustrate the structure of a sensor head associated with an electric potential measuring device according to a fifth embodiment of the present invention that includes a movable member capable of moving in the parallel direction.
Figure 7B:
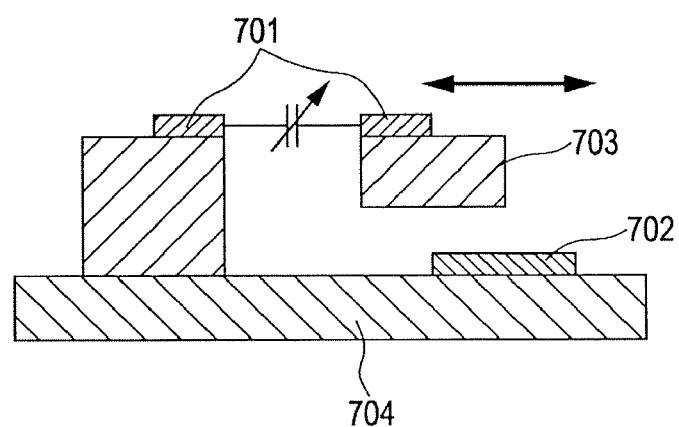

FIGS. 7A and 7B illustrate the structure of a sensor head associated with an electric potential measuring device according to a fifth embodiment of the present invention. FIG. 7A is a top view, and FIG. 7B is a cross-sectional view taken along line VIID-VIID of FIG. 7A. In this embodiment, as shown in FIGS. 7A and 7B, a detection electrode 702 is provided on the side of a support member 704, which is a fixed section. A movable member 703 changes the electric field generated between an object to be detected (not shown) and the detection electrode 702. The movable member 703 is supported by a flexible support beam 705 having one of the ends fixed to the support member 704. A change in the electric field causes the amount of electric charge generated at the detection electrode 702 to change in accordance with the electric potential of the object. Thus, the electric potential of the object can be detected.

The capacitance generated between capacitor electrodes 701 that are provided on the movable member 703 and the fixed section changes in accordance with the movement of the movable member 703 (refer to the arrow shown in FIG. 7B). In this way, information related to the movement (drive state) of the movable member 703 (i.e., amount of displacement and drive period) can be obtained. According to this embodiment, the frequency of the sensor output signal and the frequency of the drive-based signal have a relationship of 1:1.

As a driving unit configured to drive the movable member 703, for example, an electrode may be provided on the extending portion of the movable member 703 and another electrode may be provided on the fixed side in a manner such as to oppose the first electrode. Then, a modulating voltage may be actively applied between the electrodes so as to drive the movable member 703 by electrostatic attraction. In such a case, the comb-shaped electrodes shown in FIG. 3 may be suitably employed. The principle of electric potential measurement and feedback drive control of the movable member 703 are the same as those according to the first embodiment.

Sixth Embodiment

Figure 8A:
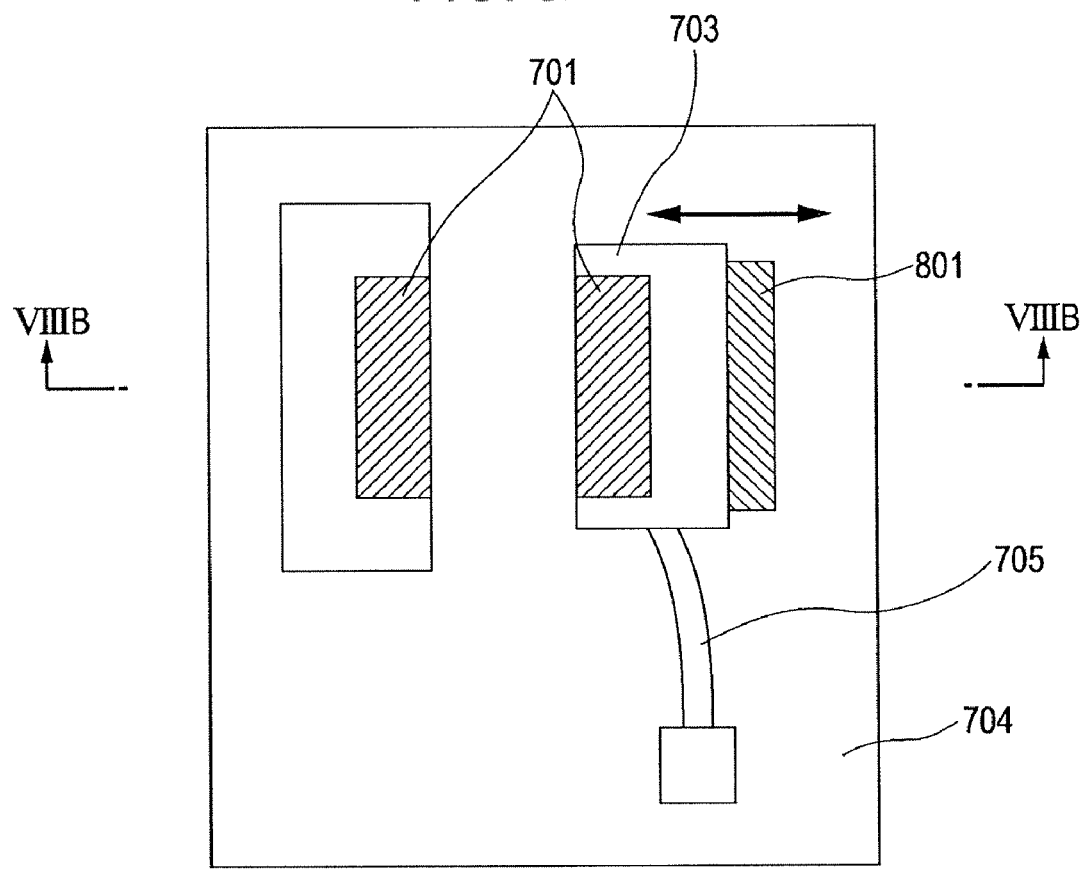
FIGS. 8A and 8B illustrate a sensor head associated with an electric potential measuring device according to a sixth embodiment of the present invention that includes two detection electrodes.
Figure 8B:
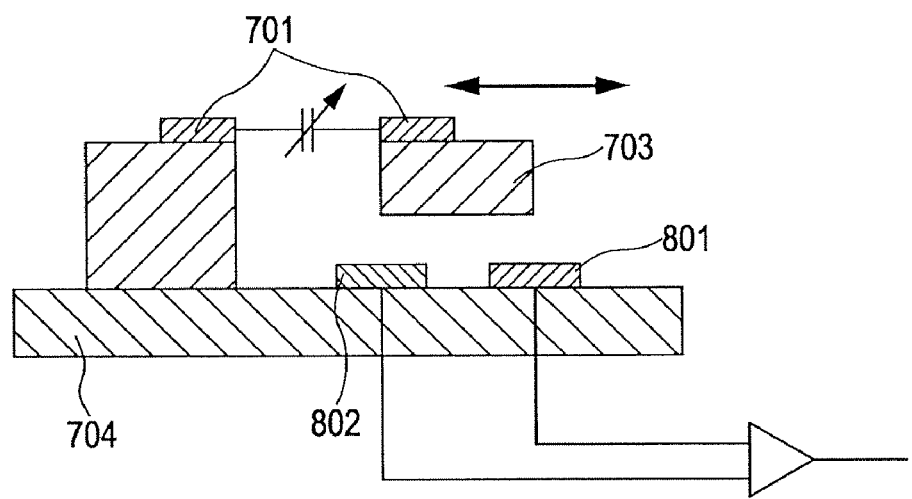

FIGS. 8A and 8B illustrate a sensor head associated with an electric potential measuring device according to a sixth embodiment of the present invention. FIG. 8A is a top view, and FIG. 8B is a cross-sectional view taken along line VIIIE-VIIIE of FIG. 8A. In this embodiment, as shown in FIGS. 8A and 8B, two detection electrodes are provided. As shown in FIGS. 8A and 8B, the relationship between a detection electrode 801 and a detection electrode 802 is such that, when a movable member 703 moves in a parallel direction, the space between an object to be detected and one of the electrodes is blocked by the movable member 703 while the space between the object and the other electrode is not blocked. In this way, the phases of the signals generated at the detection electrodes 801 and 802 are different by substantially 180°. Therefore, differential amplification can be carried out on sensor output signals, and signals having a great S/N ratio can be obtained. Other structures of this embodiment are the same as those according to the fifth embodiment.

Seventh Embodiment

Figure 9A:
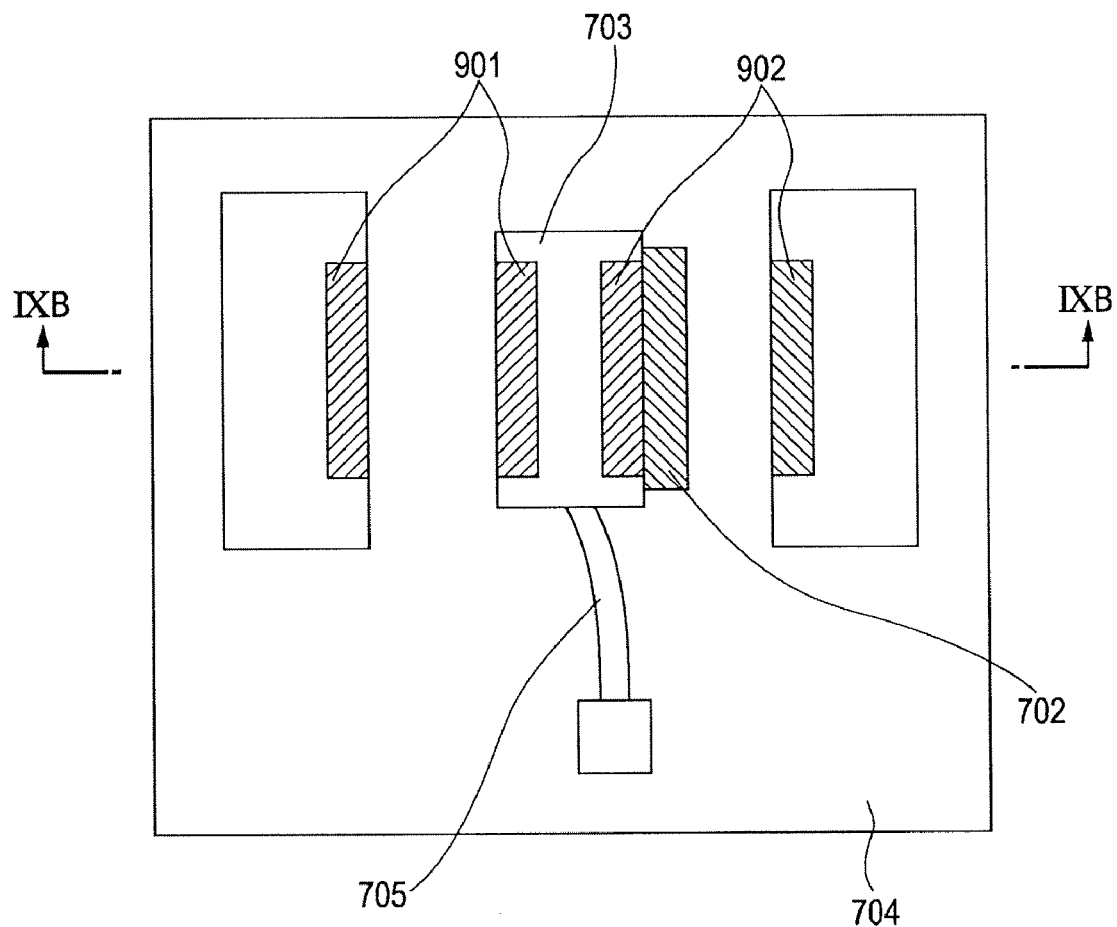
FIGS. 9A and 9B illustrate a sensor head associated with an electric potential measuring device according to a seventh embodiment of the present invention that includes capacitor electrodes provided on both sides of a movable member.
Figure 9B:
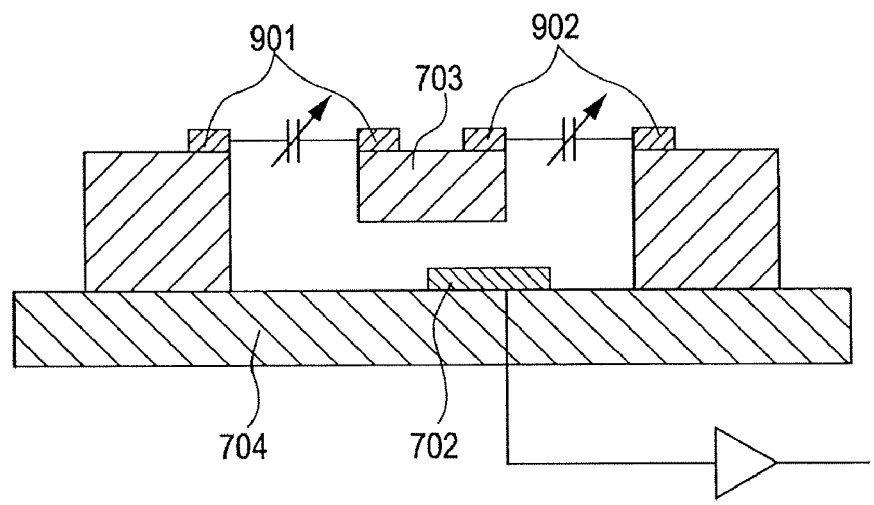

FIGS. 9A and 9B illustrate a sensor head associated with an electric potential measuring device according to a seventh embodiment of the present invention. FIG. 9A is a top view, and FIG. 9B is a cross-sectional view taken along line IXF-IXF of FIG. 9A. In this embodiment, as shown in FIGS. 9A and 9B, capacitor electrodes 901 and 902 are provided on both sides of a movable member 703 in the movement direction of the movable member 703. As shown in FIGS. 9A and 9B, when the distance between one pair of capacitor electrodes is decreased, the distance between the other pair of capacitor electrodes is increased. Therefore, the phases of the drive-based signals generated at the pairs of capacitor electrodes 901 and 902 are different by substantially 180°. In this way, differential amplification can be carried out on the sensor output signals, and signals having a great S/N ratio can be obtained. Other structures of this embodiment are the same as those according to the fifth embodiment.

Eighth Embodiment

Figure 10:
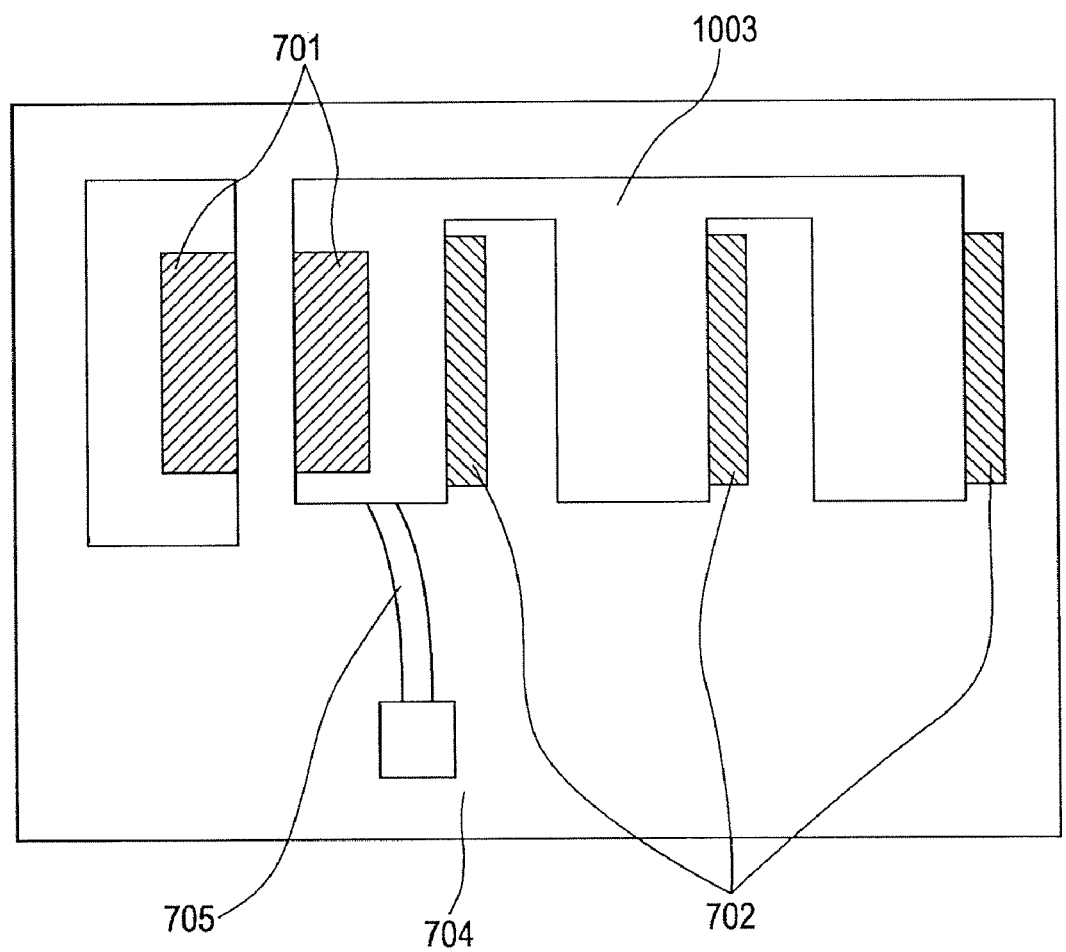
FIG. 10 is a top view of the structure of a sensor head associated with an electric potential measuring device according to an eighth embodiment of the present invention that includes aligned pairs of a movable member and a detection electrode.

FIG. 10 is a top view of the structure of an eighth embodiment in which a plurality of pairs of movable members 703 and detection electrodes 702, which are illustrated in FIG. 7, are aligned. The level of the sensor output signal is proportional to the pairs of movable members 703 and detection electrodes 702 aligned in a manner shown in FIG. 10. In this case, by forming one movable member 1003 by connecting the movable members 703, which are illustrated in FIG. 7, the movable members corresponding to the detection electrodes 702 can be moved at once. In this way, the phases of the sensor output signals obtained from the detection electrodes 702 are matched, and, by adding these signals, a high-level sensor output signal is obtained. By connecting movable members, by moving the single movable member 1003, all the connected movable members can be moved at once. Thus, the structure of the driving unit for the movable member can be simplified. Other structures of this embodiment are the same as those according to the fifth embodiment.

Ninth Embodiment

Figure 11A:
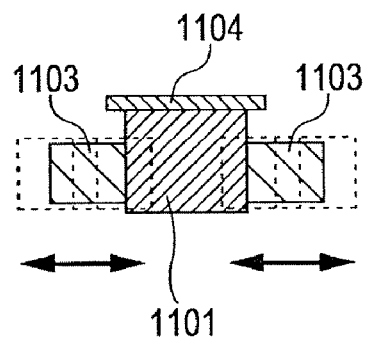
FIGS. 11A and 11B illustrate the structure of a sensor head associated with an electric potential measuring device according to an eighth embodiment of the present invention that includes a tuning-fork-shaped movable member.
Figure 11B:
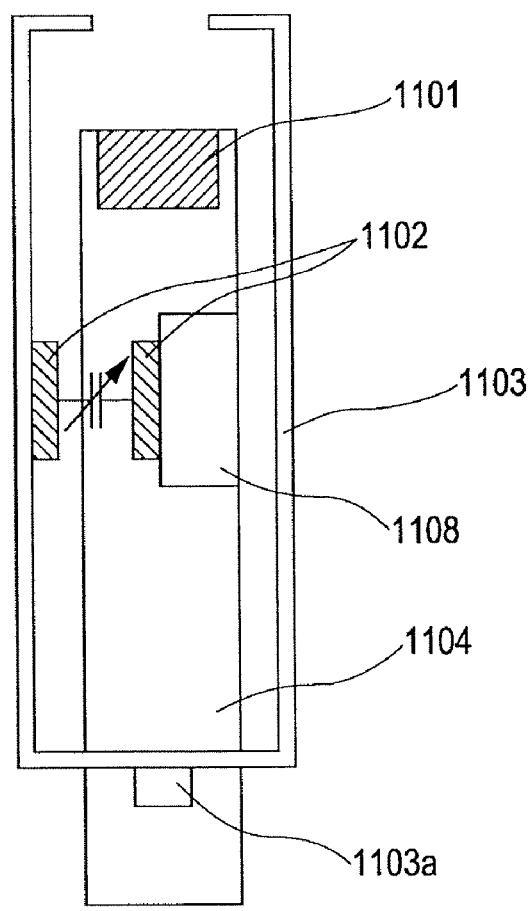

FIGS. 11A and 11B illustrates the structure of a ninth embodiment including a tuning-fork-shaped movable member that vibrates as indicated by the arrows in FIG. 11A. FIG. 11A is a top view, and FIG. 11B is a front view. FIGS. 11A and 11B illustrate a detection electrode 1101 that opposes an object to be detected (not shown), capacitor electrodes 1102, and a support member 1104, such as a printed circuit board (PCB). One of the capacitor electrodes 1102 is provided on the inner surface of one of the arms of a tuning-fork-shaped movable member 1103, whereas the other capacitor electrode 1102 is provided on a fixed section 1108 on the support member 1104. The distance between the capacitor electrodes 1102 change in accordance with the vibration of the movable member 1103. Since the base of an attachment part 1103*a* of the tuning-fork-shaped movable member 1103 is fixed to the support member 1104, the movable member 1103 is fixed to the support member 1104 in a manner that enables tuning fork vibration.

According to this embodiment, for example, by driving the tuning-fork-shaped movable member 1103 by a piezoelectric element attached to the movable member 1103, the area of the detection electrode 1101 exposed to the object is changed, and a sensor output signal is generated. At this time, a drive-based signal corresponding to the change in the distance between the capacitor electrodes 1102 is obtained. In this way, information related to the drive state of the fork-shaped movable member 1103 can be obtained. In this embodiment, the frequency of the sensor output signal and the frequency of the drive-based signal have a relationship of 1:1. The principle of electric potential measurement and feedback drive control of the movable member 1103 are the same as those according to the first embodiment.

Depending on the structure to be employed, the embodiments described above may be used independently, or a plurality of embodiments may be combined, (for example, the configuration of the capacitor electrodes shown in FIG. 6 may be applied to the structure shown in FIG. 1). In the above, embodiments of an electric potential measuring device have been described. However, the structures illustrated in FIGS. 1 and 5 can be employed to a light deflecting device by providing a light deflecting element, such as a reflective mirror, instead of a detection electrode. According to such a light deflecting device, optical scanning can be carried out with stable optical scanning width and scan period in a highly accurate manner, and excellent image formation can be carried out.

Tenth Embodiment

Figure 12:
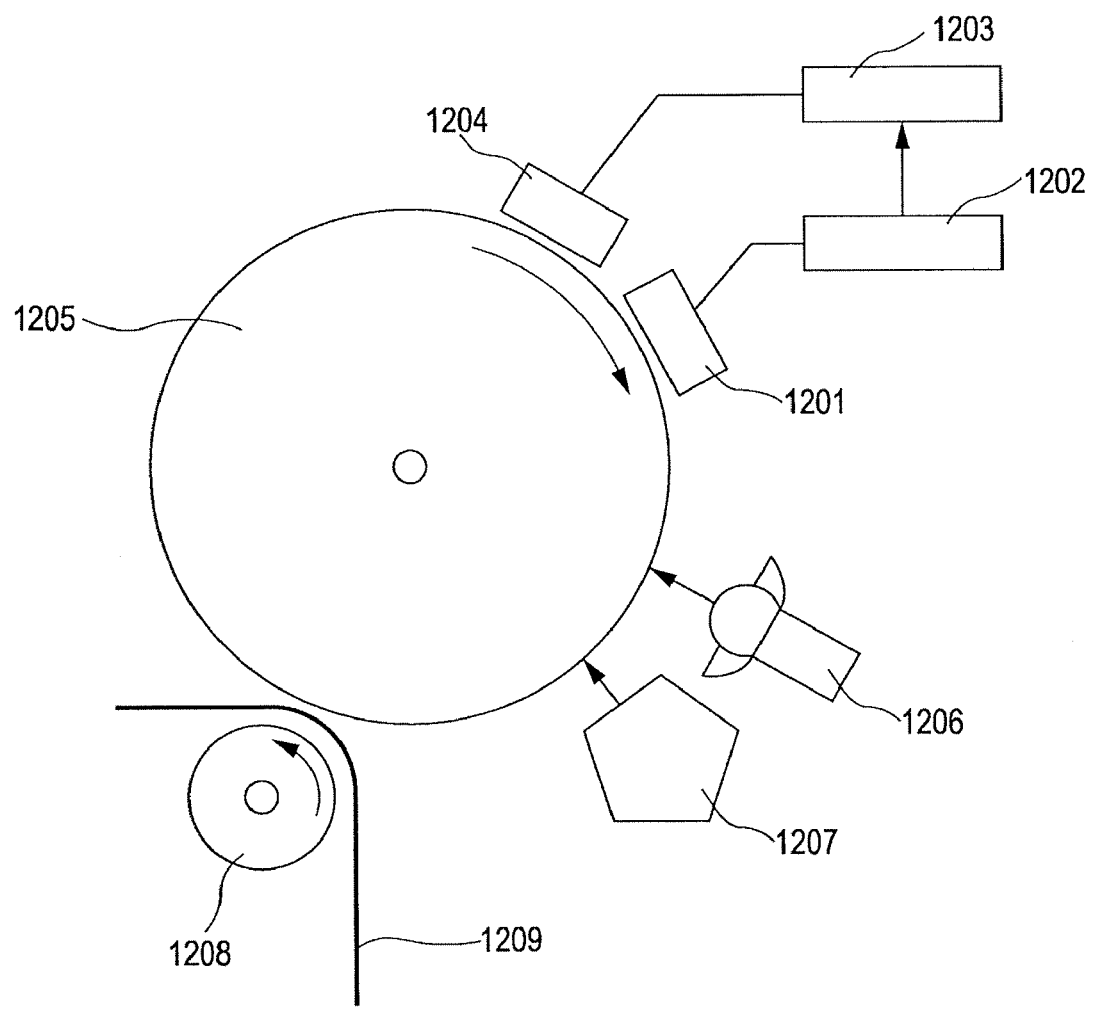
FIG. 12 is a schematic view of an image forming apparatus including an electric potential measuring device according to an embodiment of the present invention.

FIG. 12 is a schematic view of an example structure of an image forming apparatus including an electric potential measuring device according to an embodiment of the present invention. The image forming apparatus includes an electric potential measuring device 1201 according to an embodiment of the present invention, a charger 1204, a signal processing device 1202, a high-voltage generator 1203, an exposure device 1206, a toner supplying system 1207, a transfer-material feeding roller 1208, a photosensitive drum (an example of an object to be detected by an electric potential measuring device according to an embodiment of the present invention) 1205, and a transfer material 1209. Here, a light deflecting device according to an embodiment of the present invention that is capable of carrying out optical scanning with stable optical scanning width and scan period in a highly accurate manner can be included in the exposure device 1206. Thus, exposure device 1206 can irradiate the photosensitive drum 1205 by scanning a light beam that is modulated in accordance with image information.

Operation is carried out as described below. First, the drum 1205 is charged using the charger 1204. Second, a charging portion is exposed by the exposure device 1206, and a latent image is obtained. Third, toner is attached to the latent image at the toner supplying system 1207 so as to obtain a toner image. Fourth, the toner image is transferred onto the transfer material 1209. Fifth, the toner on the transfer material 1209 is melted and fixed. An image is formed by carrying out these steps. At this time, the charged state of the drum 1205 is measured using the electric potential measuring device 1201. Then, the result is processed at the signal processing device 1202. If necessary, a feedback is applied to the high-voltage generator 1203. In this way, stable drum charging is possible, and stable and high-quality image formation can be carried out.

If the drive period of the movable member of the electric potential measuring device 1201 varies or the amount of displacement (drive amount) changes while carrying of the series of steps, the charged state of the drum 1205 cannot be accurately detected. In this embodiment, since information related to the drive state of the movable member can be obtained by the capacitor electrodes, the drive period of the movable member can be prevented from varying and the amount of displacement can be prevented from changing. Thus, the charged state of the drum 1205 can be accurately detected. In this way, by installing an electric potential measuring device according to an embodiment of the present invention in an image forming apparatus, the accurate electric potential of an object to be detected (drum 1205) can be determined. Thus, charging and development of the object can be carried out in a highly accurate manner, and high-quality image formation is possible.

With an oscillating device according to an embodiment of the present invention that can be employed as an electric potential measuring device or a light deflecting device, drive information of a movable member can be obtained by a drive detection unit that is easy to produce and that has a simple structure including electrodes provided on a movable member and a fixed section. Since the drive detection unit is not easily affected by the temperature of the use environment, a highly accurate signal (i.e., drive-based signal) can be obtained relatively constantly. By processing this signal, stable drive control of the movable member is possible.

Furthermore, when the oscillating device is employed as an electric potential measuring device, by controlling the movement of the movable member with a signal from the electrodes, sensing can be carried out in a relatively stable manner so as to enable highly accurate sensing. When the oscillating device is employed as a light deflecting device, by controlling the movement of the movable member, holding a light deflecting element, by using a signal from the electrodes, light deflection scanning can be carried out in a relatively stable and excellent manner.

Furthermore, the electrodes (capacitor electrodes or comb-shaped electrodes) can be produced at once while producing the detection electrode.

Compared to when producing a piezoresistance sensor, which can falsely detect changes in displacement when the ambient temperature changes, the process according to an embodiment of the present invention is simpler and is less affected by a temperature.

By providing pairs of detection electrodes or capacitor electrodes, differential amplification can be carried out, reducing noise and increasing the S/N ratio.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-031806 filed Feb. 9, 2006, which is hereby incorporated by reference herein in its entirety.

What is claimed is:

1. An oscillating device comprising:
a movable member that is vibratable;
a fixed section that is provided opposite to the movable member;

a driving unit configured to drive the movable member at a predetermined driving frequency; and at least two electrodes configured to generate a first signal corresponding to a drive state of the movable member, with at least one electrode being provided on the movable member, and with at least one electrode being provided on the fixed section, wherein the first signal is input into the driving unit, and the driving unit controls the driving of the movable member on the basis of the input first signal.

2. The oscillating device according to claim 1, wherein the electrode provided on the movable member and the electrode provided on the fixed section are comb-shaped electrodes provided with a gap between the electrodes.

3. The oscillating device according to claim 1, wherein a plurality of electrode pairs are provided, each pair of electrodes including at least the electrode provided on the movable member and the electrode provided on the fixed section.

4. The oscillating device according to claim 3, wherein phases of the first signals from the plurality of electrode pairs are the same or differ by 180°.

5. The oscillating device according to claim 1, wherein at least one of a drive period and a drive amount of the movable member is controlled by detecting the drive state of the movable member on the basis of at least one of a period of the first signal and a level of the first signal and feeding back the detection result to the driving unit.

6. The oscillating device according to claim 1,
wherein a detection electrode is provided on the movable member or the fixed section, and
wherein the oscillating device functions as an electric potential measuring device configured to measure an electric potential of an object to be detected by driving the movable member so as to change the capacitance between the object and the detection electrode, generating a fluctuation in the amount of electric charge, and obtaining a sensor output signal on the basis of the fluctuation in the amount of electric charge.

7. The oscillating device according to claim 6, wherein the period of the sensor output signal and the period of the first signal differ.

8. A light deflecting device comprising:
a movable member that is vibratable;
a fixed section that is provided opposite to the movable member;
a driving unit configured to drive the movable member at a predetermined driving frequency;
at least two electrodes configured to generate a first signal corresponding to a drive state of the movable member, with at least one electrode being provided on the movable member, and with at least one electrode being provided on the fixed section; and
a light deflecting element,
wherein the light deflecting element is provided on the movable member, and
wherein the first signal is input into the driving unit, and the driving unit controls the driving of the movable member on the basis of the input first signal.

9. An electric potential measuring device comprising:
a movable member that is vibratable;
a fixed section that is provided opposite the movable member;
a driving unit configured to drive the movable member at a predetermined driving frequency; and
at least two electrodes configured to generate a first signal corresponding to a drive state of the movable member, with at least one electrode being provided on the movable member, and with at least one electrode being provided on the fixed section,
wherein the first signal is input into the driving unit, and the driving unit controls the driving of the movable member on the basis of the input first signal.

10. An image forming apparatus comprising:
an electric potential measuring device according to claim 9, the electronic potential measuring device outputting a sensor output signal; and
an image forming unit,
wherein the image forming unit controls image formation by using the sensor output signal output by the electric potential measuring device.

11. An electrical potential measuring device according to claim 9, further comprising, separate from the electrodes, a detection electrode configured to detect an electric potential of an object to be detected, the detection electrode being provided on the movable member or the fixed section.

* * * * *